United States Patent
Emsing et al.

(10) Patent No.: US 6,783,790 B1
(45) Date of Patent: Aug. 31, 2004

(54) PROCESS UTILIZING AGAR-AGAR IN A HIGH TEMPERATURE, SHORT TIME PROCESSING OF HIGH SOLIDS CONFECTIONERY PRODUCTS

(75) Inventors: Julie A. Emsing, York, PA (US); Sue E. Zaccano, Harrisburg, PA (US); Philip C. Ward, Palmyra, PA (US)

(73) Assignee: Hershey Foods Corporation, Hershey, PA (US)

( * ) Notice: Subject to any disclaimer, the term of this patent is extended or adjusted under 35 U.S.C. 154(b) by 0 days.

(21) Appl. No.: 09/575,085

(22) Filed: May 19, 2000

(51) Int. Cl.$^7$ .......................... A23L 1/0532; A23G 9/14
(52) U.S. Cl. ....................... 426/575; 426/660
(58) Field of Search ............................... 426/575, 572, 426/660

(56) References Cited

U.S. PATENT DOCUMENTS

| | | | |
|---|---|---|---|
| 3,620,769 A | * 11/1971 | Peterson ...................... | 426/103 |
| 3,968,267 A | * 7/1976 | Ogasa et al. ................. | 426/570 |
| 4,501,763 A | 2/1985 | Yuguchi et al. .............. | 426/573 |
| 4,759,936 A | * 7/1988 | Best et al. ................... | 426/250 |
| 5,246,725 A | * 9/1993 | Fisher et al. ................. | 426/565 |
| 5,607,716 A | * 3/1997 | Doherty et al. .............. | 426/572 |
| 5,962,053 A | * 10/1999 | Merritt, II .................... | 426/138 |

FOREIGN PATENT DOCUMENTS

| | | |
|---|---|---|
| JP | 63267245 | 11/1988 |
| JP | 64002539 | 1/1989 |
| JP | 03232453 | 10/1991 |
| JP | 05244908 | 9/1993 |

OTHER PUBLICATIONS

Groves, R., et al. "Marshmallow Production: Technology and Techniques", *The Manufacturing Confectioner*, May 1995, pp. 99–103.

Jackson, E.B., *Sugar Confectionery Manufacture*, pp. 233–235, Jan. 1995.

Jackson, E.B., *Sugar Confectionery Manufacture*, pp. 42–43, Jan. 1990.

Klacik, K., "Syrup Cooking Technology", *The Manufacturing Confectioner*, Jun. 1993, pp. 59–72.

Lees, R., et al., *Sugar Confectionery and Chocolate Manufacture*, pp. 257–260, 303–313, Jan. 1973.

Potter, N.N., "High Temperature–Short Time Pasteurization", *Food Science, Fourth Edition*, Jan. 1986, pp. 192–193.

Richmond, W., "Choice Confections–Marshmallow", *The Manufacturing Confectioner*, Feb. 1996, pp. 59–64.

Sweetmaker, "Aerated Confectionery", *Confectionery Production*, Mar. 1984, pp. 150–151.

Whistler R., et al. "Industrial Gums", Third Edition, p. 99. (date N/A).

* cited by examiner

*Primary Examiner*—Keith Hendricks
(74) *Attorney, Agent, or Firm*—Scully, Scott, Murphy & Presser (57) ABSTRACT

The present invention is directed to a continuous process for making a high solids confectionery product containing agar-agar using high temperature short time processing. The process comprises (a) preparing a homogenous mixture comprising agar-agar, an agar-agar dispersing agent in an amount sufficient to disperse and suspend the agar-agar to control hydration when in contact with water and heat, a sweetening effective amount of a sweetener, and water, said homogenous mixture containing a solids content ranging from about 60% to about 80% by weight solids; (b) feeding the homogenous mixture of step (a) to a heating apparatus having an inlet and outlet with heating means interposed therebetween, and subjecting said mixture to a high temperature short time continuous process under conditions sufficient to cook and concentrate the mixture and to evaporate the water to form water vapor; (c) removing the formed water vapor formed in step (b); and (d) cooling said mixture, thereby forming a high solids confectionery product, all of said steps (a), (b) (c) and (d) being conducted in a continuous process.

59 Claims, 2 Drawing Sheets

PROCESS UTILIZING AGAR-AGAR IN A HIGH TEMPERATURE, SHORT TIME PROCESSING OF HIGH SOLIDS CONFECTIONERY PRODUCTS

FIELD OF THE INVENTION

The present invention relates to a continuous process for making high-solids confectionery products containing agar-agar utilizing high temperature short time processing.

BACKGROUND OF THE INVENTION

Agar-Agar is a complex mixture of polysaccharides which are extracted from red seaweed. All components of the mixture contain the same backbone structure composed of alternating monosaccharide units of D-galactose and 3,6 anhydro-L-galactose. Some of the polysaccharide chains are substituted to a variable degree with charged groups, namely sulfate, pyruvic acid and uronic acid.

Agar-Agar is the least soluble of all of the polysaccharide gelling agents. It is virtually insoluble in cold water, slightly soluble in hot water and readily soluble in boiling water. It forms a strong brittle, turgid gel when hot aqueous dispersions of same are prepared and cooled.

The melting and setting properties of agar-agar display hysteresis, i.e., agar-agar jellies melt at 80°–90° C. (176°–194° F.) , yet they set at 30–40° C. (86°–104° F.). Such properties are obviously useful when depositing hot products into molds, for there is little or no risk of premature setting or pre-gelling.

Agar-agar is used in various foods, such as baking icings, no oil salad dressings and low fat yogurt.

It can also be used in many confectionery products, especially in gums and jelly products, marshmallows and the like, as a gelling agent. It is usually present in small amounts, typically ranging from 0.2% to 1.8% by weight.

One of the drawbacks of using agar-agar is that it requires a large quantity of water to make a good solution and an aqueous dispersion. Typically, it requires 30–50 times its weight in water to make an aqueous solution of same. For example, standard methods for using agar-agar in confectionery products recommend hydrating the agar-agar for several hours, usually at least 12 hours, in at least a 30:1 ratio by weight of water to agar-agar, or a short-time boiling, usually 3–5 minute boil, of the agar-agar in water at the aforementioned ratio, to fully hydrate the gum for incorporation into the high solids confectionery product. This extensive hydration time that is required makes it unattractive for use in a continuous process or in automated plants. As a result, although found in confectionery products, its use is limited to batch type operations.

Moreover, it is widely held in the confectionery industry that agar-agar cannot be used in a continuous process in which it is subjected to high temperatures. It is commonly believed in the food arts that one of the drawbacks of agar-agar is that it cannot be subjected to the high temperatures required for solubility of various components by normal pasteurization or pasteurization-like processes. Subjecting the food containing agar-agar to high temperatures has been shown to be detrimental in many food applications, e.g., the food loses its flavor or develops off-flavor.

Furthermore, since agar-agar is used in a batch process, rather than a continuous process, there are further drawbacks to its use.

A batch process is generally more expensive, more inefficient and more labor intensive than a continuous process, especially in making high solids confections. In an example of the batch process for making high solids confectionery products, an aqueous solution of sucrose is mixed with corn syrup and other ingredients in a large kettle at a concentration of about 60 to 75% solids. The solution is cooked in this kettle. The solution is normally cooked at atmospheric pressure to concentrate the product to about 85 percent solids. The solution is then cooled to about 70° C.–45° C. (158° F.–113° F.).

The above described batch method often requires multiple mixing steps and transferal of the various intermediate products prepared after each step of the process from various production apparatus and work areas until the final product is produced. These operations are not performed continuously, but batchwise. Batch processes usually require more equipment than continuous processes, and they are usually less efficient. Moreover, since the batch process is non-continuous, the various mixing steps require the continuous input of operators in order to adjust the processing parameters, resulting in the batch process requiring more manual labor relative to continuous processes.

Thus, batch processes are generally slower than continuous processes, require substantial amount of manual labor and are consequently more expensive. It also introduces a number of opportunities for error, resulting, for example, in poor or wasted batches, as the result of mis-measurement, overmixing and the like.

On the other hand, a continuous process for making high solids confectionery products has several advantages relative to a batch process. As the name suggests, a continuous process involves a continuous mode of operation. In a continuous process, automated equipment is used so that the entire process is run continuously. As soon as a vessel is emptied, it is immediately filled with, in the case of high solids confectionery, a mixture of the ingredients to be processed. By "continuous", as used herein, it is meant the mixture is introduced over an extended period of time either as a flowing stream or as a series of spaced apart portions. However, as used herein, a continuous process also includes the situation wherein the additions of the ingredients to form the uncooked mixture is performed manually or by other batch-wise means. In other words after the majority of the ingredients, i.e., gelling agent, water and sweeteners are added to the appropriate tank or apparatus, and mixed, the process is continuous thereafter. In a continuous process, the various apparatus and equipment used in the process are in fluid communication with one another. Thus an embodiment of a continuous process for making high solid confectionery contemplates adding the sugar solution and corn syrup in predetermined amounts and in measured volumes to a mixer to form a homogenous solution, introducing the solution as a flowing material into the various apparatus used in the process, such as other mixers or heaters, through inlet valves automatically and continuously or at predetermined spaced intervals, continuous removal of intermediate products from mixers and heaters through exit valves, automatically and continuously introducing the heated solution into coolers, etc. Thus, the entire process is performed continuously, with little, if any, stoppage. Thus, there are several advantages of the continuous process relative to the batch process, such as shorter processing time, reduced labor, reduced amount of material used and less cost. In consequence, modern food plants primarily utilize continuous manufacturing methods and installed equipment to effectuate such processing, incorporating high temperature short time processing steps.

Because of the problems referred to hereinabove, it has been disadvantageous heretofore to use agar-agar in high solids confectionery products. In general, high solids confectionery products prepared by a continuous process, especially those products which utilize gelling agents or have chewy characteristics, utilize other hydrocolloids. One of the most common hydrocolloids used is gelatin. High solids confections containing gelatin are produced by the continuous process, and the products produced are quite satisfactory to the public; they are stringy and chewy and, if necessary, they can be aerated to produce a marshmallow or marshmallow-like texture.

However, there are a number of disadvantages utilizing gelatin. One disadvantage is that since it contains protein, gelatin must be added after the cooking step; if added before cooking, it will denature. Moreover, there is an increased risk of microbial problems, especially if the solution containing gelatin is stored for an extended period of time. Furthermore, gelatin is prepared from collagen which is present in skins, bones, hides and connective tissues from animals. It is, therefore, generally non-kosher since, in most cases, the animal is not properly killed. Although Kosher gelatin is available, it is not only extremely expensive, but in addition, it is difficult to obtain a constant supply since availability is limited.

Thus, although gelatin is attractive since it has been used in preparing high solids confectioneries, it is also unattractive for the reasons given hereinabove, but especially because of the commercial reality that certain portions of the population may not purchase products containing non-kosher gelatin and the enhanced risk of microbial problems.

Thus, the problem was to find another gelling agent to replace gelatin which can be used in preparing high solid confectionery products by a continuous process, and which would impart the necessary chewy characteristics, stringiness and gelling properties to the confection.

The task was not simple. When the present inventors used other gelling agents instead of gelatin to prepare high solid confectionery products by a continuous process, the products containing them were inferior to the gelatin containing products. The confection products containing a gelling agent other than the gelatin did not exhibit the stringiness or chewy characteristics that are found in jellies, gum or other high solids confectionery products containing gelatin.

The present inventors also attempted to make high solid confectionery products utilizing new speciality products which have been developed in recent years which are also useful as gelling agents. These are referred to as "quick soluble agars", and they are physically modified agar-agar to permit hydration at temperatures below boiling, i.e. 60–80° C. Therefore they have several advantages, such as easy preparation, less preparation time and application to continuous cooking. However, the quick soluble agars require further processing of the agar-agar by the supplier and are very expensive. For these reasons, these quick soluble agars seemed unattractive. Furthermore, when used in attempts to make high solid confectionery products, it hydrates before cooking resulting in the pre-cooked product being more viscous. Consequently, it is more difficult to work with, for example, it exhibits less efficient heat transfer during cooking and it is more difficult to pump than if the mixture contained other hydrocolloids or, as shown hereinbelow, agar-agar.

The present inventors then focused on agar-agar. Since it is made from plants, it is kosher. However, due to its properties described hereinabove, it was never used heretofore in preparing high solids confectionery products in a continuous process. In order to use agar-agar in a continuous process, the present inventors needed to find a solution to circumvent the extensive pre-hydration procedures referred to hereinabove.

Thus, the present inventors searched for a method of using natural agar-agar in a continuous process for making high solids confectionery using high temperature and short time processing.

They finally found a solution. More specifically, they found that by mixing an agar-agar dispersing agent with agar-agar in the appropriate amounts, they could prepare high solids confectionery in a high temperature, short time continuous process without the need for the extensive pre-hydration procedures described hereinabove.

SUMMARY OF THE INVENTION

Accordingly, the present process is directed to an improved method for making a high solids confectionery product in a high temperature short time continuous process in which a homogenous mixture comprising a sweetener, agar-agar, and water is heated under cooking conditions; concentrating the cooked mixture by removing water therefrom; and then cooling the concentrated mixture, the improvement comprising (a) prior to cooking, mixing said homogenous mixture with an agar-agar dispersing agent under conditions sufficient to form a homogenous mixture, said agar-agar dispersing agent being present in an amount sufficient to control the hydration of the agar-agar; and (b) conducting the process as a continuous process and cooking the mixture under high temperature short time conditions.

The present process is also directed to a method of making a high solids confectionery product in a continuous process which comprises:

(a) preparing a homogenous mixture comprising agar-agar, an agar-agar dispersing agent in an amount sufficient to control hydration of agar-agar when water is added thereto, a sweetening effective amount of a sweetener, and water, said homogenous mixture containing a solids content ranging from about 60% to about 80% by weight solids;

(b) feeding the homogenous mixture of step (a) to a heating apparatus having an inlet and an outlet with heating means interposed therebetween and subjecting said mixture to a high temperature short time continuous process under conditions sufficient to cook and concentrate the mixture; and (c) removing the formed water vapor therefrom and cooling said cooked mixture, thereby forming said high solids confectionery product, all aforesaid steps being conducted substantially continuously in said continuous process.

DETAILED DESCRIPTION OF THE PRESENT INVENTION

The present process has wide applicability. It is useful for preparing high solids confectionery products, especially those which usually contain agar-agar and which were heretofore prepared by the batch process. Moreover, the present process permits the preparation of high solids confectionery products by a continuous process which heretofore contained other gelling agents. For example, using the process described hereinabove, confectionery products prepared by a continuous process which heretofore contained gelatin now can be prepared in a continuous process containing agar-agar.

As used herein, a "high solid confectionery product" is a confection having at least about 75% by weight solids and more preferably having a total solid content of about 80% to about 90% total solid and most preferably having a total solid content of about 84% to about 89% total solids. The high solid confectionery products produced by the present invention are crystalline or non-crystalline. Examples of high solids confectionery products that can be prepared by the present process include marshmallow, caramel, nougat, jellies and gums, such as orange slices, gum drops, gummy bears, jelly beans, fruit snacks and jujubes, chewy candy, and the like. The high solids confectionary product includes those confections in which gelling agents are typically present such as those indicated hereinabove. The term also includes confections having the solid content indicated hereinabove in which gelling agents are not normally present, but can be added to change the texture and flavor thereof, such as cremes, fondants, fudges and the like.

The confectionery product prepared by the present process contains a sweetener content of at least 70% of the total solids, and more preferably at least about 75% of the total amount of solids. It is preferred that the sweetener comprises from about 70% to about 90% by weight of the total solids in the confection and more preferably from about 75% to about 85% by weight of the total solids.

The moisture content of the high solid confectionery product of the present process is that typically found in high solids confectionery products. The moisture content varies depending upon the type of product. For example, jellies and gums typically contain 10–25% by weight moisture, caramel typically contains 8–15% by weight moisture, marshmallows typically contain about 8–25% by weight moisture, nougats contain about 9 to 11% by weight moisture, fondants typically contain 8–12% by weight moisture, cremes typically contain 8–12% moisture and fudges typically contain 8–12% moisture. Since all of these products are contemplated to be produced by the present invention, the moisture content of the high solids confectionery products produced by the present process range, depending upon the product, from about 5% to about 25% by weight moisture. In the more preferred products of the present invention, the moisture content of the product produced by the present process ranges from about 8% to about 15% by weight of the total weight of the product.

The water activity of the confectionery products formed in accordance with the present invention is less than or equal to 0.65.

Water activity is a measurement of the amount of water available for chemical reactions in foods, e.g., browning, enzyme activity, microbiological spoilage, hydration of colloids, and the like. It is a measurement of the free water available for chemical reactions. A higher water activity signifies that more free water is available, while a lower water activity indicates less free water is available. Obviously, the water activity is related to the amount of water present in the food, but the relationship is quite complex and non-linear. In addition, water activity is dependent upon other factors, such as the amount and type of solids present in the food and the interaction of the solids with water. Thus, even if two foods contain the same moisture content, the water activity would be different if the solid composition of the foods are different.

It is important to maintain the water activity below a certain level. In general, molds grow on foods with water activity greater than 0.70, yeast grow on foods having water activity greater than 0.8, and bacteria grow on foods having water activity greater than 0.9. It is preferred, therefore, that the water activity of the confectionery products produced by the present process is below 0.65.

The water activity of the confectionery product formed in accordance with the present invention preferably ranges from about 0.30 to about 0.65 and more preferably from about 0.30 to about 0.45.

The ingredients used in preparing the confectionery products are those typically found in confections.

One of the ingredients utilized is a sweetener. The sweetener content of the cooked material used as a component in the final product is at least about 70% of the solids, and more preferably from about 75% to about 90% of the solids, as described hereinabove. As used herein, the term "sweetener" is a sweetening agent that normally is used to sweeten confectionery products. They include such foods as sugars, corn syrups, invert sugar, and the like.

A sugar is a carbohydrate normally used in confectionery products. Preferably, the sugars are water soluble. The sugars can be monosaccharides, especially D-monosaccharides, dissaccharides, polysaccharides or mixtures thereof. The sugar can be a ketose or an aldose and may contain 3, 4, 5 or 6 carbon atoms. Examples of sugars that may be utilized include ribose, arabinose, lyxose, allose, altrose, gulose, idose, talose, ribulose, xyulose, tagatose, erythrulose, sorbose, xylose, glucose, mannose, galactose, fructose, sucrose, maltose, lactose, invert sugar (a mixture of fructose and glucose derived from fructose), and the like or mixtures thereof. The preferred sugars are monosaccharides and dissaccharides. The more preferred sugars are ribose, xylose, glucose, mannose, lactose, fructose, sucrose, and maltose. The even more preferred sugars are sucrose, glucose, and fructose, and the most preferred sugar is sucrose.

Sugar substitutes and sugar replacements can also be utilized as the sweetening agent. However, if present, they are present up to about 40% by weight of the sweetening agent content. Examples include bulking agents, such as polydextrose, dextrins, and maltodextrins, inulin and hydrolyzed products thereof, corn syrup solids, cellulose, cellulose derivatives and extracts and the like; sugar alcohols, such as sorbitol, xylitol, mannitol, maltitol and the like; hydrogenated starch hydrolysate (HSH), isomalt and the like; and mixtures thereof. Preferred sugar substitutes and sugar replacement are polyols, e.g., sorbitol, inulin, polydextrose, maltodextrin, HSH and isomalt.

Sweeteners also include corn syrup and invert sugars or foods containing same, such as honey, molasses, maple sugar and the like.

By corn syrup, it is meant a purified concentrated solution of nutritive saccharide obtained from starch and having a DE of 20 or more.

There are various types of corn syrup. There are regular acid converted corn syrup, acid-enzyme converted corn syrup, enzyme-enzyme converted corn syrup and enzyme isomerized corn syrup. All of these various corn syrups are contemplated to be used in the process of making the confectionery products of the present invention.

The acid converted corn syrups are those derived from the acid hydrolysis of starch. Examples of this type corn syrup are glucose syrup and starch syrup, for example, 42 DE acid converted syrup. (DE refers to dextrose equivalent, which is defined as the percent reducing sugars, calculated as dextrose on a dry substance basis).

In the 1950's, high maltose syrups were introduced. These are produced by first converting the starch to a DE of about 20 and then treating it with a maltogenic enzyme such as α-amylase or β-amylase, both of which selectively hydrolyze the starch to maltose. Typically, the hydrolysate produced by this method contains about 40 to about 50 wt % maltose. Higher levels of maltose, i.e., 60–80 wt %, are produced by saccharification with a combination of a maltogenic enzyme and a debranching enzyme, e.g., pullulanase.

The high fructose corn syrups are prepared from the regular acid conversion of starch, which provides the dextrose or glucose syrup which is then treated with an enzyme that converts the dextrose to fructose (an isomerization reaction).

Examples contemplated within the term corn syrup include glucose syrup, high maltose syrup, DE acid converted syrup, such as 42 DE corn syrup, as well as the high fructose corn syrup. The corn syrups utilized in the present process can have a DE value ranging from as low as 20 to a value as high as 68 or higher. The term "corn syrup", as used herein, contemplates all of these various types of corn syrup. To distinguish between the various corn syrups, if necessary, the present specification will utilize the term "acid converted corn syrup", "acid enzyme corn syrup", "enzyme-enzyme converted corn syrup" and "high fructose corn syrup".

The preferred corn syrups are the regular acid converted corn syrups, and the high fructose corn syrup. More specifically, it is preferred that the confectionery product produced by the present process contain at least the acid converted corn syrup and optionally contain the high fructose corn syrup.

The sweetener may be one sweetener or a mixture of two or more sweeteners. If the sweetener is a sugar, it is preferred that a second sweetener is present. The second sweetener is one that controls sugar crystallization. As would be expected during the process of making confections in which sugar is an ingredient, it is necessary to minimize sugar crystallization during the last steps of the process. Thus, the second sweetener is present in amounts that controls sugar crystallization in the final product. Examples of such sweeteners include invert sugar and corn syrup, especially the acid converted corn syrup, acid enzyme corn syrup, and enzyme-enzyme converted corn syrup, and foods containing either invert sugar or corn syrup or both, as described hereinabove.

It is preferred that the confectionary products produced by the present process contain a mixture of sweeteners. It is more preferred that the sweetener comprises sugar, especially sucrose, and a sweetening agent that controls sugar crystallization.

The second sweetener which controls sugar crystallization is preferably corn syrup. This second sweetener which controls sugar crystallization is used in the present process not only to impart sweetness to the confection, but it also controls hydroscopicity, water activity, viscosity, and texture. It is preferred that the corn syrups utilized are 42 DE, corn syrup, 62 DE corn syrup, and 55 high fructose corn syrup. When the first sweetener is sugar, the second sweetener is utilized in amounts that controls the crystallization of the sugar.

Another component of the present invention is the agar-agar. The agar-agar is present in amounts sufficient to form a gel and/or enhance viscosity of the cooked material. The agar-agar also imparts the chewy property and the stringiness of the confectionery product and is present in the confectionery products in amounts sufficient to impart those characteristics thereto. Preferably, the agar-agar is present in amounts ranging from about 0.1 to about 2% by weight, more preferably from about 0.1% to about 1.5% and most preferably from about 0.1% to about 0.5% by weight.

As described hereinabove, it was discovered by the present inventors that the addition of an agar-agar dispersing agent to the agar-agar prior to the heating step in sufficient amounts, as defined herein, permitted the use of agar-agar in a continuous process. As used herein, the term "agar-agar dispersing agent" is a flowable liquid that is capable of suspending, dispersing and/or separating the agar-agar to permit a controlled hydration when water is added thereto. Alternatively, a dry granular material, such as crystalline fructose, maltodextrin, crystalline sorbitol, polydextrose, and especially sugar, e.g., sucrose, can be dry blended with the agar-agar separately, or with the sweetener, water and other optional ingredients to form a substantially homogenous flowable material. Hereinafter, the terms "slurry", and "homogenous mixture", as used herein, will include such material in their definitions.

Thus, in the presence of the agar-agar dispersing agent each particle of the agar-agar can hydrate properly when in contact with water. The agar-agar dispersing agents include polyhydroxy compounds, especially sugars, sugar alcohols, and alkanes containing from 1 to 6 carbon atoms, which are substituted by polyhydroxy groups, in which the number of hydroxy groups is at least equal to the number of carbon atoms present; corn syrup and fat. Examples include glycerin, sorbitol, dry granular sugar, such as sucrose, and corn syrup and fat. The agar-agar dispersing agent when mixed with agar-agar is in liquid form; thus if it is a solid at room temperature, it is melted and used in its melted form. The preferred agar-agar dispersing agent has a viscosity of 50 to 5000 centipoise, preferably 50 to 2000 centipoise and most preferably 100 to 600 centipoise. However, solids such as fats and oils including vegetable oils which are defined hereinbelow can be used in its melted form (as long as they are not decomposed) as the agar-agar dispersing agent and mixed with the agar-agar at temperatures sufficient to form the slurry. It is preferred that the fats and oils, in the melted forms have the aforementioned viscosity at the melting temperatures. The most preferred agar-agar dispersing agent is glycerin.

As indicated hereinbelow, the agar-agar dispersing agent, the agar-agar, sweetener, water and other optional ingredients are mixed together under conditions sufficient to form a homogenous mixture. This is effected using standard techniques in the art, such as heating the mixture, agitation (including vigorous agitation), and the like. However, it is preferred that the agar-agar dispersing agent is mixed separately with the agar-agar under conditions sufficient to form a homogenous mixture (slurry), and that this slurry is then mixed with the sweetening agent, water and optional ingredients.

In preparing the slurry comprising agar-agar and agar-agar dispersing agent, the agar-agar dispersing agent is mixed separately with the agar-agar under conditions sufficient to form a homogenous mixture (slurry). Water may be present as long as the viscosity ranges indicated hereinabove are maintained. If necessary, the agar-agar dispersing agent may be heated to effect the formation of the homogenous mixture. If the agar-agar dispersing agent is a fat, then the agar-agar dispersing agent is heated to a temperature which is equal to or greater than its melting temperature but less than its decomposition temperature and/or vaporization temperature, and is mixed with the agar-agar at a temperature within this range to form the slurry, as described hereinbelow.

The inventors have found that the agar-agar dispersing agent is present in an amount sufficient to disperse and suspend the agar-agar so that it controls hydration when in contact with water and heat. If the agar-agar is mixed separately with the agar-agar dispersing agent, the agar-agar dispersing agent is present in an amount to form a homogenous mixture (slurry) with the agar-agar. At this concentration, proper hydration occurs when water is added to the agar-agar, and the agar-agar is cooked, as described herein.

It is preferred that the weight ratio of agar-agar dispersing agent (e.g., glycerin) to agar-agar is at least about 2.5:1. Although there is no upper limit, for practical reasons, it is more preferred that the weight ratio of agar-agar dispersing agent to agar-agar ranges from about 2.5:1 to about 300:1 and even more preferably from about 2.5:1 to about 60:1 and especially more preferably from about 2.5:1 to about 10:1 and most preferably at about 4:1.

It is to be understood that the amount of agar-agar dispersing agent referred to hereinabove is the amount that is added to the agar-agar to disperse and suspend the agar-agar so that it controls hydration when in contact with water and heat. Additional agar-agar dispersing agent, such as glycerin may be added to the solution containing water and sweetener.

Additional ingredients (optional ingredients) may additionally be present in the product of the present invention. For example, if corn syrup is not utilized as a sweetener, then it may be utilized in any of its forms as an additional ingredient. If, on the other hand, it is utilized as the sweetener then additional corn syrup may be added to the pre-cooked product. For example, if the regular acid converted corn syrup is present as the sweetener, high fructose corn syrup may also additionally be present in the confectionary products produced by the present invention. High fructose corn syrups (HFCS) are concentrated solutions containing primarily fructose and dextrose with lesser quantities of higher molecular weight saccharides. Commercial products contain 42, 55 or 90% fructose on a dry weight base. By diluting the HFCS or by mixing various amounts of HFCS 42, HFCS 55 or HFCS 90, the HFCS utilized may contain various concentrations of fructose ranging from about 0% to 90%. The preferred HFCS are HFCS 42 and HFCS 55.

Food grade cations may also be present in the confectionary products. The food grade cations include the edible cations of Groups IA, IIA and IIIA of the periodic table, especially Groups IA and IIA. They are preferably GRAS and water soluble. Examples include water soluble salts of potassium, sodium, ammonium, magnesium, calcium, and the like. The preferred edible cations are salts of calcium or potassium or magnesium, such as potassium chloride, calcium lactate, calcium chloride, calcium carbonate and the like. If present, the food grade cations are preferably present in amounts ranging from 0 to about 5% by weight and preferably less than 2.5% by weight.

If the fat is not utilized as an agar-agar dispersing agent the confectionery product may also contain fat. Moreover, even if the fat is utilized as an agar-agar dispersing agent, the confections may contain additional fat. The additional fat content of the confectionary may vary from 0 to about 40% by weight for products that contain chocolate, and from 0% to about 20% for fruit flavored and caramel products. It is preferred that the additional fat content is present in less than about 15% by weight.

The fats utilized as either the agar-agar dispersing agent or the additional ingredient are those fats normally employed in confectionery products. Suitable fats and oils include fractionated fat and hydrogenated, partially hydrogenated and unsaturated oils, such as coconut, palm, palm kernel, cotton seed, safflower, soy, corn oil, milk fat, cocoa butter, hydrogenated vegetable oil, butter and the like and mixtures thereof. The term "fats" and "oils" are used interchangeably, although there may be differences as understood by the skilled artisan. "Fats" is generally a term that refer to the solid embodiment of the above-mentioned groups and "oils" refers to the liquid form.

Additional additives may also be present, such as emulsifiers, like lecithin, mono- and diglycerides or polysorbate, polyglycerol ester and the like. If present, the emulsifier is present in an amount ranging from about 0% to 5% by weight.

Salts, such as sodium chloride, may optionally be present. If present, it is present in an amount ranging from about 0 to about 2.5% by weight.

The confections prepared by the present invention may also include other additives, such as preservatives and anti-oxidants, such as BHA, BHT, TBHQ, citric acid, and the like, which are present in anti-oxidizing effective amounts.

Another additive that may be present in the confections produced by the present invention is colorants. The colorants may be present in amounts of up to 1% by weight. The colorants may include pigments, such as titanium dioxide or include other dyes suitable for food. A full recitation of all food colorants and their corresponding chemical structure may be found in Kirk-othmer Encyclopedia of Chemical Technology, $3^{rd}$ Edition in Volume 5 at Pages 857–884, the contents of which are incorporated by reference.

Another additive, flavorings, may be included in the confectionery products produced in accordance with the present invention. These flavorings include those known to the skilled artisan, such as natural and artificial flavorings. Examples include flavor oils, e.g., peppermint, or cinnamon, and the like; artificial, natural and synthetic fruit flavors, such as vanilla, artificial vanilla, powdered honey, citrus oils and the like; or fruit juices, including lemon, orange, lime, grapefruit and the like; and fruit essences, including apple, pear, peach, grape strawberry, raspberry, cherry, plum, pineapple, apricot, and the like.

The amounts of flavoring employed is normally a matter of preference subject to such factors as flavor type, strength desires and individual preferences.

Thus, the amount may be varied in order to obtain the result desired in the final product. Such variations are within the capabilities of those skilled in the art without the need for undue experimentation. In general, amounts of about 0.1% to about 5.0% by weight of flavoring agents are useable.

The confections produced in accordance with the present invention may also contain effective amounts of acidulants, such as malic acid, citric acid, tartaric acid, adipic acid, and mixtures thereof.

Any other conventional ingredients used in confections, such as other sweeteners, other seasonings, other materials derived from fruit and/or vegetable, for example, pulp, puree of fruit and/or vegetable and the like, may also be present in the confections of the present invention.

As indicated hereinabove, additional agar-agar dispersing agent in amounts greater than used to hydrate the agar-agar, when contacted with water may additionally be present in the confectionery product. In addition, proteins, such as milk proteins and soy proteins, may also be added to the confectionery product.

In addition, nuts or pieces of nuts, such as peanuts, pecans, macadamia nuts, and the like may also be contained in the confection.

The confection may also employ crispy bakery products and cereals, like rice, puffed cereal, cookies, crackers and the like.

The type of optional ingredients added will vary, depending upon the targeted confection. The optional ingredients added to the uncooked homogenous mixture are thus typically added to make the desired confectionery product, e.g., jellies, gummy products, nougats, marshmallow, caramels, fudges, cremes, fondants, and the like.

The confections of the present invention are prepared as described hereinabove.

The agar-agar, the agar-agar dispersing agent, the sweetener, water and optional ingredients are mixed together under conditions sufficient to form a homogenous mixture. Heating and sufficient mechanical agitation to form a vortex in combination with a slow addition of agar-agar may be required to form the homogenous mixture. If heating is required, it is preferred that the temperature of the mixture is heated to a temperature ranging from about room temperature to about 180° F., and more preferably from about room temperature to about 160° F.

The heated mixture is then pumped to a heating apparatus for cooking, as described hereinbelow. As an alternative method, the various ingredient may be mixed in a mixer which is then pumped to an evaporation holding tank, from which portions of the mixture is pumped into the heating apparatus (cooker).

However, it is preferred that the pre-cooked mixture is prepared in two steps.

The agar-agar and agar-agar dispersing agent are first mixed together in an amount sufficient to form a slurry under conditions sufficient to form the slurry. Heating may be required to effect the formation of the slurry. If the agar-agar dispersing agent is a fat, then the fat is melted as described hereinabove and the melted fat is mixed with the agar-agar at temperatures sufficient to maintain the fat in its molten form to form the slurry. Moreover, the temperature may be maintained or raised to a higher temperature when the molten fat and agar-agar are mixed with the sweetener, water and any other ingredients. It is preferred that the agar-agar is added to the agar-agar dispersing agent when mixed to form the homogenous slurry. It is also preferred that no additional water is added to the agar-agar and agar-agar dispersing agent either before or during the mixing. The agar-agar and agar-agar dispersing agent in its liquid form are mixed sufficiently to form a homogenous slurry.

In the second step, the slurry is mixed with the other components, water, sweetener, such as corn syrup or sugar or mixture thereof and any other additives under conditions sufficient to produce a homogenous mixture. Alternatively, the sweetener and water or other ingredients may be added to the slurry comprising the agar-agar and the agar-agar dispersing agent either individually or they may be added as a homogenous solution or suspension to the slurry. Moreover, the sweetener and water and other ingredients may be added manually or batchwise or they may be added in a continuous manner. Preferably, the slurry and the water, sweetener and any other additive are heated to a temperature sufficient to form the homogenous mixture. It is preferred that the mixing be conducted at temperatures ranging from about room temperature to about 180° F., more preferably to about 160° F. The homogenous mixture may be a solution or slurry (suspension). The ingredients are mixed in a mixing vessel, e.g., such as the batch tank.

Regardless of the method for preparing the pre-cooked mixture, the amount of solids present in the mixture at this point prior to cooking preferably ranges from about 60 to about 80% by weight and more preferably from about 65% to about 75% by weight; the pH of the mixture preferably ranges from about 5.0 to about 8.0.

The heated pre-cooked mixture is pumped to a heating apparatus and the mixture is heated under conditions sufficient to cook the mixture. Preferably, the temperature of the homogenous mixture in the heating apparatus ranges from about 180° F. to about 260° F. Moreover, the heating is conducted under high temperature short time conditions in which the heating apparatus is a plate-like heat exchanger which permits each drop of the solution or each particle of the suspension to be heated to the requisite temperature. Under these conditions, the heating is effected for a sufficient amount of time to cook the mixture. Preferably the cooking is effected in less than 2 minutes and more preferably less than 1 minute and most preferably less than 40 seconds, for example, 5–15 seconds. The cooking may be effected at atmospheric pressure or under a vacuum or under reduced pressure, e.g., less than 1 atmosphere. Cooking the mixture at these high temperatures for such a short period of time is referred to as high temperature short time heating or processing. This technique is known in the food art. Examples of heaters used in high temperature short time processing include plate frame cookers, thin film cookers, and the like.

During the heating step, water in the mixture is converted to water vapor. Thus, the cooking step also concentrates the solution. The cooking is conducted until approximately the desired solids concentrations is achieved, which, as indicated hereinbelow, occurs, under the high temperature short time processing in less than about two minutes.

After the cooking step, the mixture is pumped from the heating apparatus to another vessel, wherein water vapor formed during the cooking step is removed. The mixture is next cooled. Additional water vapor may evaporate during or after cooling, and as a result, the resultant mixture becomes more concentrated.

After the confection is cooled to about 110° F., and more preferably to about 120° F. and even more preferably to about 140° F., it may be blended with other components, such as crispy bakery products, cereals, rice, nuts, or mixtures thereof or it may be aerated to form marshmallows, or any combination thereof and then processed. Alternatively, the cooked mixture may be charged to suitable containers for later use or for further processing. For example, the hot product may be put in molds wherein it is cooled and then cut into pieces. Alternatively, the product may be cooled using techniques known in the art, such as a cooling tunnel, to form slabs, which may be cut into smaller pieces. After the processing step, the product is ready for marketing, and can either be eaten or packaged.

The process described hereinabove is conducted continuously, such that the mixture is transferred from one vessel automatically by means known to one skilled in the art such as a pump. Thus, in the continuous process, as soon as one vessel in the process is emptied, it is immediately filled. This constant and automatic continuing emptying and filling of each of the vessels is continued throughout the process described hereinabove. However, as defined hereinabove, the various components, may be added manually or batchwise.

Figure 1:
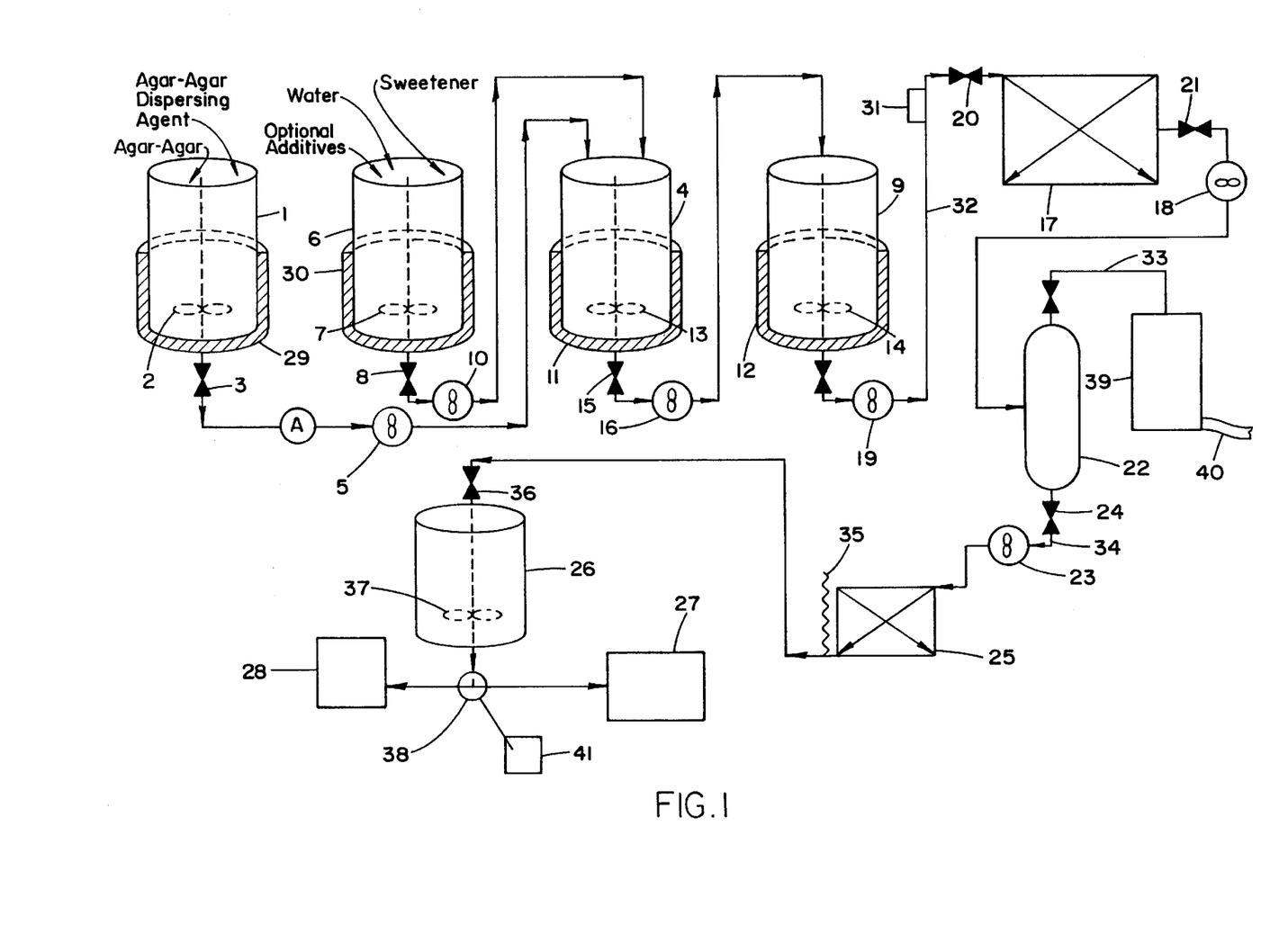
FIG. 1 is a schematic representation of a preferred process used in practicing the present invention.

A schematic illustrating a preferred embodiment of the present invention is illustrated in FIG. 1.

Agar-agar dispersing agent and agar-agar are mixed together as described hereinabove in a mixing tank (1) containing a mixing apparatus (2) until the components are substantially evenly dispersed. A set amount of agar-agar/agar-agar dispersing agent is drained from the bottom through a valve (3) to the syrup batching tank (4) by a pump (5). To ensure that sufficient amount of blend is removed for mixing with the other ingredients, the agar-agar/agar-agar dispersing agent may be weighed prior to being added to the syrup batching tank. The mixture may be heated with heater (29) at temperatures effective to form a homogenous slurry.

A homogenous solution of the sweetener and water, and other optional ingredients, such as calcium salt and bulking agent, is prepared in a mixing tank (6) using a stirring device (7) under conditions effective to form the homogenous solution (sweetener solution). If temperatures higher than room temperature are required, then a heater or steam is utilized under conditions to solubilize the ingredients to form a solution or to evenly disperse the components, in a homogenous mixture. The homogenous solution produced in the mixing tank (6) is drained from the bottom through a valve (8) and pumped with pump (10) to the syrup batching tank (4), mixed with the slurry comprising agar-agar and agar-agar dispersing agent in the syrup batching tank (4) and the contents are stirred with a stirring device (7) to make homogenous. Alternatively, the sweetener, water and other optional components may be added manually together under conditions sufficient to form a homogenous solution in the mixing tank (6). In another embodiment, the water, sweetener and other optional components may be added individually to the syrup batching tank in the absence of the slurry comprising agar-agar and agar-agar dispersing agent. In still another embodiment, the sweetener solution may be formed in the syrup batching tank (6) to which is added the slurry described hereinabove.

The syrup batching tank is preferably connected to a heating device (11). The contents, i.e., the slurry and the sweetening solution are stirred with a stirring device (13) and heated to a first temperature for a time sufficient to evenly or substantially evenly disperse all of the components. It is preferred that the heating is effected at temperature ranging from room temperature to about 160° F. and more preferably from about 135° F. to about 160° F. After the components are evenly dispersed, the new mixture is transferred through valve (15) by a pump (16) to the evaporator feed tank (9) which is connected to a heating device (12) which maintains the mixture at a second temperature, which second temperature is greater than or equal to the first temperature, but less than the cooking temperature described hereinbelow. It is preferred that the temperature of the evaporator feed tank ranges from about room temperature to about 180° F. and more preferably from about 130° F. to about 180° F. and even more preferably from about 140° F. to about 170° F. The contents therein are stirred with a stirring device (14). The mixture is maintained at the second temperature to minimize the heat load requirement for the final cooking process. The solution is then continuously fed to the heating apparatus (17) by a pump (19) through an inlet valve (20).

This evaporator feed tank (9) can also be viewed as a storage area inasmuch as only a limited amount of solution can be fed into the heating apparatus (17). Thus, when a portion of the solution is being heated in the heating apparatus, the remainder of the solution is held in the evaporator feed tank. After the solution is cooked in the heating apparatus and is pumped by a pump (19) through the outlet valve of the heating apparatus, the next set portion of the solution in the evaporator feed tank is pumped into the heating apparatus (17).

The heating apparatus (17) is one which provides sufficient heat transfer from the apparatus contact surface to the homogenous mixture (solution or slurry). One particularly useful apparatus is a thin film evaporator wherein the solution is fed through an inlet (20) to the apparatus and through a tube (not shown) to the outlet (21) of the heating apparatus, whereby the solution is heated in the tube. The temperature in the tube may be higher at one end than at the other end or it may be relatively uniform throughout.

An example of such a heating apparatus is a plate and frame heat exchanger used in high temperature short time (HTST) processing. In HTST processing, the solution from the evaporator feed tank is pumped through a plate type heat exchanger and brought to the requisite temperature. The key to the process is that virtually every drop of the solution, or if it is a homogenous suspension virtually every particle is heated to the requisite temperature. This is accomplished by pumping the heated solution through a tube of such length and diameter that it takes every drop of solution or particle of homogenous suspension at least 10 seconds and more preferably from about 10 seconds to about 2 minutes even more preferably from about 10 sec. to about one minute and most preferably from about 10 seconds to about 40 seconds to pass through the tube.

The solution or homogenous suspension supplied to the heating apparatus is heated to cooking temperatures, and preferably at a temperature to concentrate the carbohydrate solution. The cooking is effected under condition sufficient to vaporize the water and to concentrate the mixture to about the predetermined amount of solids. Preferably, the temperature is greater than about 180° C. and less than about 260° C.

Upon exiting the heating apparatus through exit valve (21), the water vapor is separated from the liquid phase. The separation of water vapor from the syrup is effected by any means known to an artisan of ordinary skill. One such means is by pumping the cooked solution or suspension into a flash tank (22) or a cyclone separator, i.e., vapor/liquid separator, which separates the two phases, disposing of the gaseous phase, i.e., water vapor and directing the liquid phase to the next phase of the process; that is, the concentrated syrup is pumped via a pump (23) through an exit valve to a cooler (25), where the cooked product is cooled to a temperature below 175° F. and more preferably below 150° F. and more preferably between 130° F. and 150° F. The cooling is preferably imparted rapidly to the cooked solution or suspension. In a more preferred embodiment, the cooked solution or suspension is pumped through a plate cooler (25) and then into tank (26). In an embodiment, not shown, for the preparation of marshmallows and nougats, the cooled solution may be passed through an aerator known to the skilled artisan and the contents beaten therein. If an aerator is utilized, it is preferably after tank (26). From there it may be ultimately charged to a storage container (27) or it may be blended with other materials.

Colorants or flavoring agents may be added to the product as indicated hereinabove in the syrup batching tank (14) or in the mixing tank (6). Alternatively, optional ingredients, such as colorings and flavorings, may be added to the product in tank 26 through inlet valve (not shown) in a continuous manner.

However, in the embodiment shown in FIG. 1, there are preferably two mixing tanks (1) and (16) which are provided with stirrers (2) and (7), respectively. The vessels may be attached to heating means (29) and (30) such as steam jackets. In vessel (1), the agar-agar and the agar-agar dispersing agent are mixed together to form a homogenous slurry. Preferably, the tank is filled with that amount of agar-agar dispersing agent that is to be used and the agar-agar is added thereto while the mixture is being stirred. The sweetener and water and other ingredients, such as salts, cation, bulking ingredients second sweetener and the like are added to the second vessel (6) with stirring with a stirring device and heated, if necessary, with the heating device (30) until the mixture is homogenous.

As schematically drawn each of the tanks 1 and 6 have drain valves 3 and 8. However, the mixture in tanks 1 and 6 may be added manually to the syrup batching tank (4), as described hereinabove.

Each of the valves are in fluid communication with pump 5 and 9 which is adapted to pump the slurry comprising agar-agar and the agar-agar dispersing agent into the syrup batching tank 4. Alternatively, in another embodiment shown in FIG. 2, the slurry comprising the agar-agar and agar-agar dispersing agent is prepared in tank 1 and the homogenous mixture is added to the syrup batching tank (4) with the separate components of the sweetener solution, such as sweetener, water, and other optional ingredients. The components are mixed under conditions sufficient to form a homogenous mixture. The syrup batching tank (4) is connected to a heater (11) which if necessary may be used to help make the mixture homogenous. The contents are then pumped into another tank, the evaporator feed tank, which is also linked with heating means (12), such as a steam jacket. The mixture is heated to a temperature sufficient for the contents to remain homogenous. Preferably, the temperature of the evaporator feed tank ranges from about 130° F. to about 180° F., and more preferably from about 140° F. to about 170° F. The evaporator feed tank can hold more than one batch of mixture; preferably it holds at least two batches.

Figure 2:
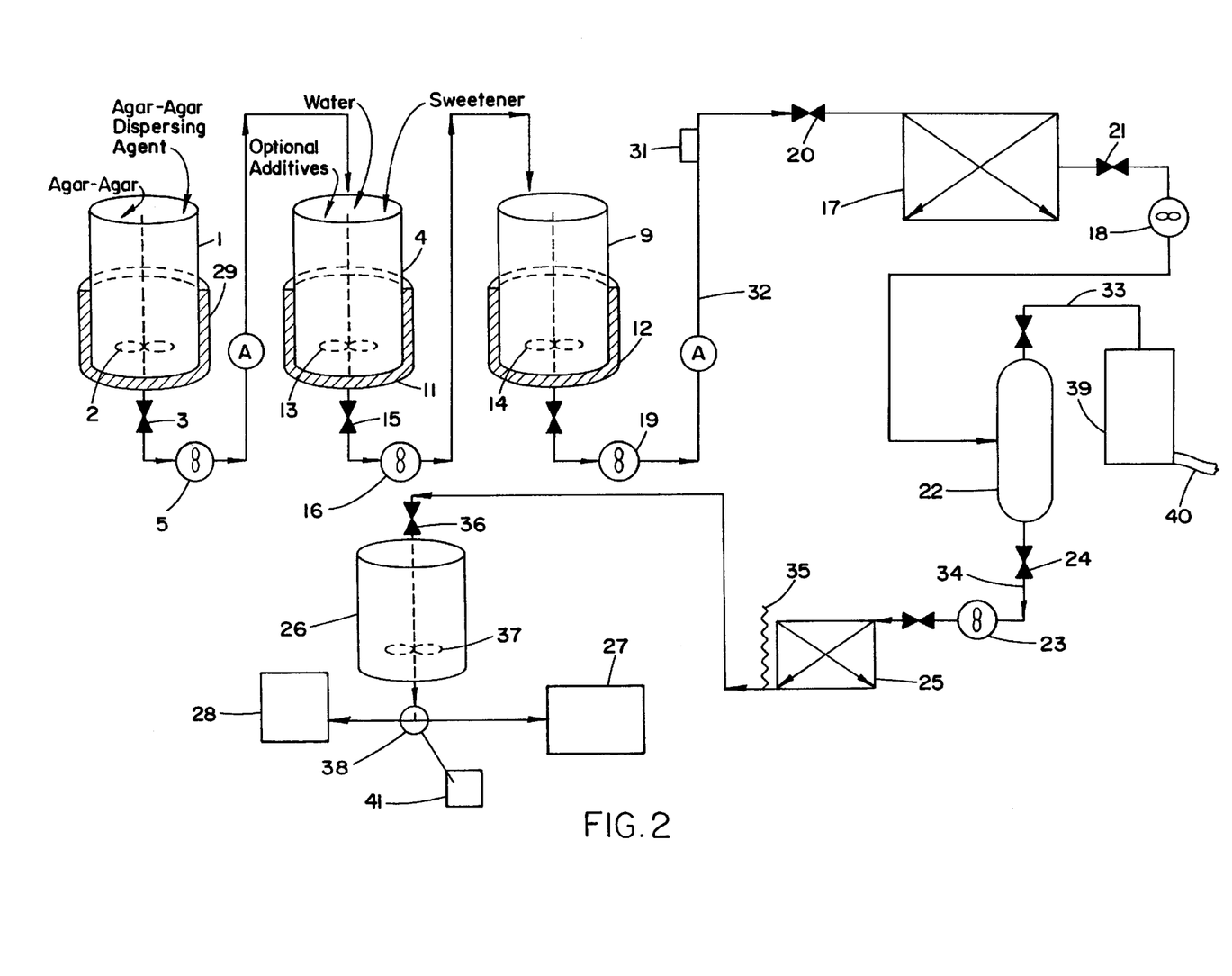
FIG. 2 is a variation of the schematic representation of the process of FIG. 1.

A batch of the material is pumped into the heating apparatus (17) described hereinabove and is cooked for the short time at high temperature. A monitor (31) may optionally be attached through line (32) connecting the heating apparatus (17) and the evaporator feed tank (9). The homogenous mixture in line 32 may be monitored for water activity, moisture or solids amounts (brix) or any combination thereof to ensure that the homogenous mixture pumped into the heating apparatus has the proper characteristics. For example, in one embodiment, the water activity preferably ranges from about 0.3 to about 0.5 and more preferably from about 0.440 to about 0.480 at 25–30° C. If through the monitoring, the characteristics of the precooked homogenous mixture pumped through line 32 is not within the desired ranges, other characteristic will also be determined to confirm the previous findings. As would be expected, if the characteristics of this precooked solution is not within predetermined specification, then the entire product batch prepared from this precooked mixture will be discarded and the process started anew. On the other hand, if the precooked solution is within he predetermined specification, then the products produced by the process will be maintained.

The heating apparatus, through which the homogenous mixture passes, is in fluid communication with a vapor liquid separator 22, which removes water vapor through an overhead line 33 in fluid flow communication with the separator 22, while allowing a more concentrated mixture to pass in a downward direction into line 34 through valve 24 which is in fluid communication with pump 23 which moves the mixture through line 34 into cooling unit 25. The cooling unit 25 is comprised of a jacket 35 which is adapted to receive and discharge cooling water. The jacket is positioned above the cooling chamber (not shown). The line from the cooling unit is directed to valve (36) to tank (26) containing a stirrer (37) to maintain homogeneity of the cooked mixture. The mixture is still hot and is maintained at temperatures ranging up to about 140° F., and more preferably from about 110° F. to about 140° F. The tank (26) is connected to a valve (38) which is a three position valve allowing for the collection of material per se into storage (27) or for routing the material to a blender (28) for subsequent mixing with other ingredients, or for further processing (41). Alternatively, the valve (38) may be in a closed position.

It is to be noted that throughout the process, flow of the material from start to finish is in the direction of arrow A.

Because the process is continuous, when an outlet valve is open, the inlet valve to a vessel is closed and vice versa. Thus, when one of the mixing tanks is drained of its contents to a subsequent vessel in the process, the valve at the top of the tank is closed, the valve at the bottom of the tank is opened, the valve at the top of the vessel (if present) is opened, and the valve at the bottom of the vessel is closed. Subsequently, the reverse occurs when the emptied tank is recharged. The valve at the bottom of the tank is closed, while the valve at the top of the tank is opened. When the homogenous mixture is pumped to the evaporation feed tank from the syrup batching vessel, the bottom valve of the evaporation feed is closed, while the valve at the bottom of the syrup batching vessel is opened and the valve, if present, at the top of the evaporation feed tank is open. However, when the contents of the evaporator feed tank are pumped into the heater, the valve into the evaporator feed tank is closed, while the valve leading from the evaporator feed tank is open. After the material has passed through the heater, there is a two phase system, a liquid phase and a gaseous phase comprised primarily of water vapor. The mixture is charged into the vapor liquid separator (22) which discharges the gaseous phase or water vapor through overhead line (33) and into vessel (39) where the vapor is cooled and condensed to water and the water is then discharged through discharge (40) to a collecting vessel.

The concentrated mass is pumped from the separator through pump (23), moving the material into the cooling unit (25) where it is cooled. From the cooling unit the material is fed through vessel (26) then to the valve (28) wherein the mass is mixed with other components (28), processed (41), or is directly passed through to the storage bin (27).

As indicated hereinabove, if a marshmallow or a nougat or a food containing same is to be prepared, before being pumped to tank (26), the cooled slurry is pumped to the aerator, wherein the contents are aerated and beaten and then the aerated cooled mixture is pumped to tank (26).

Using the procedure described herein various confectionery products can be prepared. For example, jellies and gums which have the common general characteristics of being chewy can be prepared. Orange slices, gum drops, gummy bears, jelly beans, fruit snacks and jujubes represent some of the product types. These can be prepared by mixing the agar-agar with the agar-agar dispersing agent such as glycerine as described hereinabove and mixing it with homogenous solution of sucrose, corn syrup and/or invert sugar and additives, such as flavors, colors and acidulents. The mixture is then pumped through the heating apparatus, and then the water vapor separated out and the mixture is partially cooled. The partially cooled material may then be cast into starch, plastic or metal molds or formed into slabs and dried to 80–92% solids and then cooled to room temperature.

As another example, marshmallows may be prepared. The agar-agar and agar-agar dispersing agent such as glycerin are slurried together until homogenous, and mixed with sugar, water, corn syrup, and other additives e.g., invert sugar, dextrose, sodium hexametaphosphate, powdered sugar, color, and flavor. After the heating step and removal of the water vapor, and cooling, the homogenous mixture is passed through an aerator (not shown). The aerator is located between cooler (25) and tank (26). Any aerator normally used in the confectionary art may be utilized. Examples include Mondomix, Rotomix, GEI, Oakes or Votator. The mixture is aerated and the mixture beaten using techniques known in the art, such as by a pressure beater or continuous pressure beater, and the like.

The products herein may be enrobed with chocolate or mixed with other ingredients. For example, the cooked and partially cooled product in tank (26) may be mixed with other material separately made containing, for example, nuts or chocolate or cereal or crispy bakery products or combination thereof. For instance, the product may be metered in and mixed with a homogenous slurry containing peanut butter and ground peanuts, salt, anti-oxidant, and other additives. The product resulting therefrom is extruded onto a belt. The product then proceeds through a cooling tunnel to set the slab and then it proceeds to a guillotine which sets the length. The product then may be partially or fully enrobed with chocolate.

Thus, the present process enables the preparation of high solids confectionery using agar-agar in a continuous process.

It is to be noted that, unlike most continuous processes wherein the gelling agent after prehydration is added to the cooked mixture, in the present process, the agar-agar is added to the mixture prior to cooking. Thus, the need to add pre-hydrated agar-agar after the cook stage in the present process is eliminated.

Thus, by utilizing the present process, high solid confectionery products can be prepared in a continuous process. Moreover, agar-agar taken through the process is fully hydrated and functional without the need for the prior and extensive prehydration times.

Thus, the present process has several advantages. It is efficient. This is the first process that permits the use of natural unmodified agar-agar in preparing high solids confectionery in a continuous process. Other advantages of utilizing agar-agar in this way include (1) long pre-hydration times of agar-agar are eliminated; (2) processing viscosity of the batch slurry remains low, allowing more efficient pumping and heat transfer since agar-agar does not hydrate until reaching the heating apparatus; (3) the need to add pre-hydrated agar-agar after the cook stage is eliminated; (4) continuous processing can be accomplished; and (5) it allows addition of divalent cations (such as Ca++, Mg++) to the batch slurry without cross-linking or chemical interference with the agar-agar.

Unless indicated to the contrary, all percentages are by weight on a dry weight basis.

As used herein, the singular includes the plural and vise versa.

The present invention is illustrated by the following non-limiting examples.

EXAMPLE 1

Using the apparatus schematically described in FIG. 1, the following confection was prepared.

21.5 g of glycerin was added to a tank with stirring. 5.34 g of agar-agar was added to the tank with stirring in small batches. When all of the agar-agar was added, the blend was mixed for an additional 10–15 minutes to ensure homogenicity.

In a second tank heated to 140° F. were added 819 g of corn syrup 42 DE, about 274 g of sucrose, about 132 g water, about 280 g of additional glycerine and about 468 g HFCS 55, and the ingredients were mixed until a homogenous solution (sugar solution) is obtained. The sugar solution was pumped to a third tank.

The agar-agar/glycerin homogenous mixture was also pumped into a third tank where it was mixed with the sugar solution. Then tank was heated to 155° F. while mixing for a minimum of ten minutes to insure all ingredients were dispersed fully. Once the resulting homogenous mixture, i.e., syrup, reached 155° F. and the requisite time had elapsed, the syrup was transferred to the evaporator feed tank, which maintained the premix at a temperature of about 155° F. The solution was supplied to the heating apparatus, a plate heat exchanger, continuously where it was heated at 208° F. for 39 seconds. The heating was conducted under vacuum, at about 371 mm Hg. It was pumped through the plate heat exchanger and into the flash tank, wherein water vapor was separated from the solution. The concentrated cooked syrup is pumped from the flash tank through a plate cooler and into tank (26). The solution became more concentrated as more water was vaporized. The vapor condenses using cooling water that is below 80° F. to maintain constant removal of condensate. The product was allowed to cool. This product exhibited good stringiness. In addition, it didn't hydrate in the batch; the resulting product had low viscosity and no visible clumping. The texture of the product of Example 1 was similar to the target, i.e., a product containing 1% gelatin.

The product formed had the requisite stringiness and adhesiveness that was sought in the targeted product. However, when the agar-agar was substituted with other gelling agents and/or hydrocolloids, the products formed were substantially inferior, with the exception of the product containing quick soluble agar. However, when the quick soluble agar was utilized, processing was substantially more difficult than with agar-agar, as described below.

Comparative Example 1

(Control)

The above experiment was repeated except that there was no hydrocolloid added. The product had short texture, no stringing.

Comparative Examples 2 and 3

The procedure of Example 1 was repeated, except GP 911, carageenan (gelcarin) and GP 328, carageenan (viscarin) were used in Comparative Examples 2 and 3, respectively, instead of agar-agar. Both hydrated in the batch. The batch was viscous and nonhomogenous and could not be pumped. Also very little stringing was seen.

Comparative Example 4

The procedure of Example 1 was repeated, except Avicel CL 611, cellulose gel (microcrystalline cellulose and sodium carboxymethyl cellulose) was used in lieu of the agar-agar.

The product became white. Moreover, very little stringiness was observed in the product.

Comparative Example 5

The procedure of Example 1 was repeated, except that Rhodigel EZ (Xanthan gum) was used in lieu of agar-agar.

There was no visible stringing. The product was slimy.

Comparative Example 6

The procedure of Example 1 was repeated except that Colloid 600 (furcelleran) was used in lieu of agar-agar.

The product exhibited little stringiness. In fact this product exhibited characteristics similar to the control.

Comparative Example 7

The procedure of Example 1 was repeated except that Flogel 60 (starch, food starch modified) was utilized in lieu of agar-agar.

The product was slightly stringier than the control, but still exhibited very short texture.

Comparative Example 8

The procedure of Example 1 was repeated, except that Flogel 65 (starch, food starch modified) was utilized in lieu of agar-agar.

The product had short texture, much shorter than the control. It also exhibited no stringiness.

Comparative Example 9

The procedure of Example 1 was repeated, except that a quick soluble agar-agar was utilized in lieu of agar-agar.

The agar-agar hydrated immediately in the batch. The viscosity of the pre-cooked product was greater than that of Example 1. Moreover, the product containing the quick soluble agar-agar was significantly more difficult to process and harder to pump. But, the pumped product was similar to Example 1.

Comparative Example 10

The procedure of Example 1 was repeated except that Avicel LM 310 (microcrystalline cellulose) was used in the lieu of agar-agar.

The resulting texture of the product was short and there was no stringiness.

EXAMPLE 2

A gummy bear product is prepared as follows:

The procedure of Example 1 is followed, except the following components are mixed together under conditions to form a homogenous mixture.

|  | Amount |
| --- | --- |
| Agar-Agar | 1% |
| Glycerine | 3.5% |
| Water | 14% |
| Sucrose | 31% |
| Citric Acid | 15% |
| 42 DE Corn Syrup | 49% |

The mixture is passed through the heater at 210° F. for 30 seconds and the water vapor removed until the product has a moisture content of about 15%. It is cooled to about 30–40° C., and while liquid, a set amount is placed into starch molds, wherein it is allowed to cool.

EXAMPLE 3

Marshmallow

Using the apparatus diagramed in FIG. 1, a marshmallow product was prepared as follows: 20 grams of agar-agar is added slowly to 80 grams of 42 DE corn syrup in mixing tank 1 and mixed at room temperature until a homogenous slurry is formed. The slurry is pumped to the syrup batching tank (4) which is maintained at 180° F.

600 grams of sucrose, 700 grams of water, 320 grams of 42 DE corn syrup and 7 grams of sodium citrate are mixed together in a mixing tank (6) at about 140° F. until a homogenous solution is formed. The homogenous mixture is pumped from the mixing tank (6) to the syrup batching tank (4) and the slurry is mixed with the homogenous solution until a homogenous mixture is formed. The homogenous mixture is pumped to a plate and frame cooker (17) and is heated at 208° F. under 371 mmHg and the homogenous mixture passes therethrough in about 37 seconds. The mixture is concentrated to about 76% solids. The water vapor thus formed and the homogenous mixture is pumped to the flash tank (22) wherein the water vapor is separated and removed. The concentrated syrup is pumped from the flash tank through a plate cooler (25) and the cooked mixture is cooled to about 120° F. The cooled mixture is pumped to a Votator aerator where it is aerated by means of an air compressor. The aeration is maintained until the mixture forms a firm elastic foam. The foam is pumped to tank (26), wherein it is removed and placed in starch moulds at room temperature for 12–24 hours and allowed to set until the marshmallow is formed.

The above preferred embodiments and examples were given to illustrate the scope and spirit of the present invention. These embodiments and examples will make apparent to those skilled in the art other embodiments and examples. the other embodiments and examples are within the contemplation of the present invention. Therefore, the present invention should be limited only by the amended claims.

What is claimed is:

1. A process for making a high solids confection in a continuous process comprising:

(a) preparing a homogenous mixture comprising agar-agar, an agar-agar dispersing agent in an amount sufficient to disperse and suspend the agar-agar when in contact with water and heat, a sweetening effective amount of a sweetener, and water, said homogenous mixture containing a solids content ranging from about 60% to about 80% by weight solids;

(b) feeding the homogenous mixture of step (a) to a heating apparatus having an inlet and outlet with heating means interposed therebetween, and subjecting said mixture to a high temperature short time continuous process under conditions sufficient to cook and concentrate the mixture and to evaporate the water to form water vapor;

(c) removing the water vapor formed in step (b); and (d) cooling said mixture, thereby forming a high solids confectionery product, all of said steps (a), (b) (c) and (d) being conducted in a continuous process.

2. The process according to claim 1 wherein step (a) comprises mixing agar-agar with an agar-agar dispersing agent under conditions sufficient to form a slurry and mixing said slurry with a mixture comprising a sweetener and water under conditions effective to make a homogenous mixture comprising agar-agar, agar-agar dispersing agent, water, and sweetener.

3. The process according to claim 1 wherein the agar-agar dispersing agent and agar-agar are mixed in step (a) at a weight ratio of agar-agar dispersing agent to agar-agar of at least 2.5:1.

4. The process according to claim 3 wherein the weight ratio of agar-agar dispersing agent to agar-agar ranges from about 2.5:1 to about 300:1.

5. The process according to claim 4 wherein the weight ratio ranges from about 2.5:1 to about 60:1.

6. The process according to claim 5 wherein the weight ratio ranges from about 2.5:1 to about 10:1.

7. The process according to claim 6 wherein the weight ratio is about 4:1.

8. The process according to claim 1 wherein the mixture comprises additional confectionary components.

9. The process according to claim 1 wherein the agar-agar dispersing agent has a viscosity ranging from about 50 to about 5000 centipoise.

10. The process according to claim 9 wherein the viscosity of the agar-agar dispersing agent ranges from about 50 to about 2000 centipoise.

11. The process according to claim 10 wherein the viscosity of the agar-agar dispersing agent ranges from about 100 to about 600 centipoise.

12. The process according to claim 1 wherein the agar-agar dispersing agent is a polyhydroxy substituted alkane having 1–6 carbon atoms wherein the number of hydroxy substituents is at least equal to the number of carbon atoms, a sugar alcohol, a dry granular sugar, corn syrup, a liquified fat or oil.

13. The process according to claim 12 in which the agar-agar dispersing agent is glycerin, a sugar, sorbitol, corn syrup a liquified fat or oil.

14. The process according to claim 1 in which the agar-agar dispersing agent is glycerine.

15. The process according to claim 1 in which the sweetener is a sugar, corn syrup or a mixture thereof.

16. The process according to claim 1 wherein the sweetener is corn syrup.

17. The process according to claim 1 wherein the sweetener is sugar.

18. The process according to claim 17 wherein a second sweetening agent is additionally present in an amount sufficient to limit crystallization of the sugar.

19. The process according to claim 1 in which the sweetener is a mixture of sugar and corn syrup.

20. The process according to claim 19 in which the corn syrup is regular acid converted corn syrup or enzyme-enzyme converted corn syrup.

21. The process according to claim 20 wherein high fructose corn syrup is additionally present.

22. The process according to claim 19 wherein the sugar is sucrose.

23. The process according to claim 1 wherein the mixture is heated in a plate frame cooker.

24. The process according to claim 1 in which the homogenous mixture is cooked in the heating apparatus at temperatures ranging from about 180° F. to about 260° F. for up to about 2 minutes.

25. The process according to claim 24 in which the mixture is cooked in the heating apparatus for up to about 1 minute.

26. The process according to claim 25 in which the mixture is cooked in the heating apparatus from about 2 seconds to about 40 seconds.

27. The process according to claim 1 wherein step (d) further comprises cooling the product to a temperature ranging from about 140° F. to about 170° F., aerating and beating the cooled product and further cooling the aerated product.

28. The process according to claim 1 in which the agar-agar is present in the confectionery product of step (d) in an amount by weight ranging from about 0.1% to about 2%.

29. The process according to claim 1 in which the sweetener is present in the confectionery product of step (d) in a concentration of at least about 70% of the solids.

30. The process according to claim 1 which comprises:
(a) preparing a homogenous mixture comprising agar-agar, glycerin, water, sugar in sweetening effective amounts and a second sweetening agent present in amounts sufficient to limit crystallization of said sugar, agar-agar being present in a concentration of about 0.1 to about 2.0% by weight of the solids, and glycerin being present in a weight ratio of glycerin to agar-agar of at least 2.5:1;
(b) feeding the homogenous mixture of step (a) to a heating apparatus having an inlet and outlet with heating means interposed therebetween, and subjecting said mixture to a high temperature short time continuous process under conditions sufficient to cook and concentrate the mixture and to evaporate the water to form water vapor;
(c) removing the water vapor formed in step (b); and
(d) cooling said mixture, thereby forming a high solids confectionery product, all of said steps (a), (b) (c) and (d) being conducted in a continuous process.

31. The process according to claim 30 wherein step (a) comprises mixing the agar-agar with glycerin under conditions sufficient to form a homogenous slurry, and mixing said slurry with a mixture comprising water, the sugar, and the second sweetening agent under conditions sufficient to form said homogenous mixture.

32. The process according to claim 30 wherein the weight ratio of agar-agar dispersing agent to agar-agar ranges from about 2.5 to about 300:1.

33. The process according to claim 32 wherein the weight ranges from about 2.5:1 to about 10:1.

34. The process according to claim 33 wherein the weight ratio is about 4:1.

35. The process according to claim 30 wherein the second sweetener is corn syrup.

36. The process according to claim 35 wherein the corn syrup is acid converted corn syrup.

37. The process according to claim 30 wherein the sugar is sucrose.

38. The process according to claim 30 wherein the mixture is heated in a plate frame cooker for at most about 2 minutes.

39. The process according to claim 38 wherein the mixture is heated at a temperature ranging from about 180° F. to 260° F.

40. The process according to claim 38 wherein the mixture is heated at from about 30 seconds to about 1 minute.

41. The process according to claim 36 in which high fructose corn syrup is additionally present.

42. In an improved method for making a high solids confectionery product in which a mixture comprising a sweetener, agar-agar, and water is heated under cooking conditions; concentrating the cooked mixture by removing water therefrom; and then cooling the concentrated mixture, the improvement comprising (a) prior to cooking, mixing an agar-agar dispersing agent with said mixture under conditions sufficient to form a homogenous mixture, said agar-agar dispersing agent being present in an amount sufficient to disperse and suspend the agar-agar; and (b) conducting the process as a continuous process and cooking the mixture under high temperature short time conditions.

43. The improved process according to claim 42 wherein step (a) comprises mixing the agar-agar dispersing agent with said agar-agar under conditions sufficient to form a slurry and adding said slurry to a solution comprising sweetener and water under conditions sufficient to form said homogenous mixture.

44. The improved process according to claim 42 wherein the weight-ratio of agar-agar dispersing to agar-agar is at least 2.5:1.

45. The improved process according to claim 44 wherein the weight ratio of agar-agar dispersing agent to agar-agar ranges from about 2.5:1 to about 300:1.

46. The improved process according to claim 45 in which the weight ratio ranges from about 2.5:1 to about 10:1.

47. The improved process according to claim 46 in which the weight ratio is about 4:1.

48. The improved process according to claim 42 wherein the sweetener is a sugar.

49. The improved process according to claim 48 wherein the sugar is sucrose.

50. The improved process according to claim 48 wherein an additional sweetener is present, in an amount sufficient to limit crystallization of said sugar.

51. The improved process according to claim 50 wherein the second sweetener is corn syrup.

52. The improved process according to claim 50 wherein the sugar is sucrose and the second sweetener is corn syrup.

53. The improved process according to claim 52 wherein the corn syrup is 42 DE corn syrup.

54. The improved process according to claim 42 wherein the agar-agar dispersing agent is glycerin, sugar alcohol, dry granular sugar, corn syrup, a liquified fat or oil.

55. The improved process according to claim 54 wherein the sugar alcohol is sorbitol.

56. The process according to claim 54 wherein the agar-agar dispersing agent is glycerin.

57. The improved process according to claim 42 wherein the mixture is heated in a plate frame cooker.

58. The improved process according to claim 42 in which the homogenous mixture is cooked in the heating apparatus at temperatures ranging from about 180° F. to about 260° F. for up to about 2 minutes.

59. The improved process according to claim 42 which additionally comprises aerating and beating the product as it is cooling from about 170° F. to about 120° F.

* * * * *